United States Patent [19]

Venson

[11] Patent Number: 4,596,309

[45] Date of Patent: Jun. 24, 1986

[54] APPALACHIAN TREE TRUSS

[76] Inventor: Jerry W. Venson, 409 Maple St., Manchester, Tenn. 37355

[21] Appl. No.: 535,575

[22] Filed: Sep. 26, 1983

[51] Int. Cl.4 .................. A01M 31/02; A45F 3/26; A47C 9/10
[52] U.S. Cl. ............................. 182/187; 108/152
[58] Field of Search ................. 182/187, 188, 182; 108/152

[56] References Cited

U.S. PATENT DOCUMENTS

| | | | |
|---|---|---|---|
| 3,460,649 | 8/1969 | Baker | 182/187 |
| 3,856,111 | 12/1974 | Baker | 182/187 |
| 3,991,853 | 11/1976 | Bridges | 182/187 |
| 4,137,995 | 2/1979 | Fonte | 182/187 |
| 4,148,376 | 4/1979 | Campbell | 182/187 |
| 4,230,203 | 10/1980 | Sweat | 182/187 |
| 4,236,602 | 12/1980 | Leggett | 182/187 |
| 4,369,858 | 1/1983 | Babb | 182/187 |
| 4,417,645 | 11/1983 | Untz | 182/187 |
| 4,458,782 | 7/1984 | Meyer | 182/187 |
| 4,475,627 | 10/1984 | Eastridge | 182/187 |

Primary Examiner—Reinaldo P. Machado
Attorney, Agent, or Firm—C. A. Phillips

[57] ABSTRACT

A tree stand of the general character where two V-shaped edge members support a platform on a tree and in which the platform itself is of truss construction. The top of the platform comprises a carpet and sound deadening and camouflage enabling pads are positionable on the underside of the platform within the truss construction.

5 Claims, 3 Drawing Figures

APPALACHIAN TREE TRUSS

SUMMARY OF THE INVENTION

This invention is an improvement over conventional models in that it is more versatile and durable. It is as large yet as compact, versatile, weather-resistant, and durable as possible and can be carried in rough terrain or left in such places as the Appalachian Mountains in which the stand was designed and tested.

DESCRIPTION OF THE PREFERRED EMBODIMENT

Figure 1:
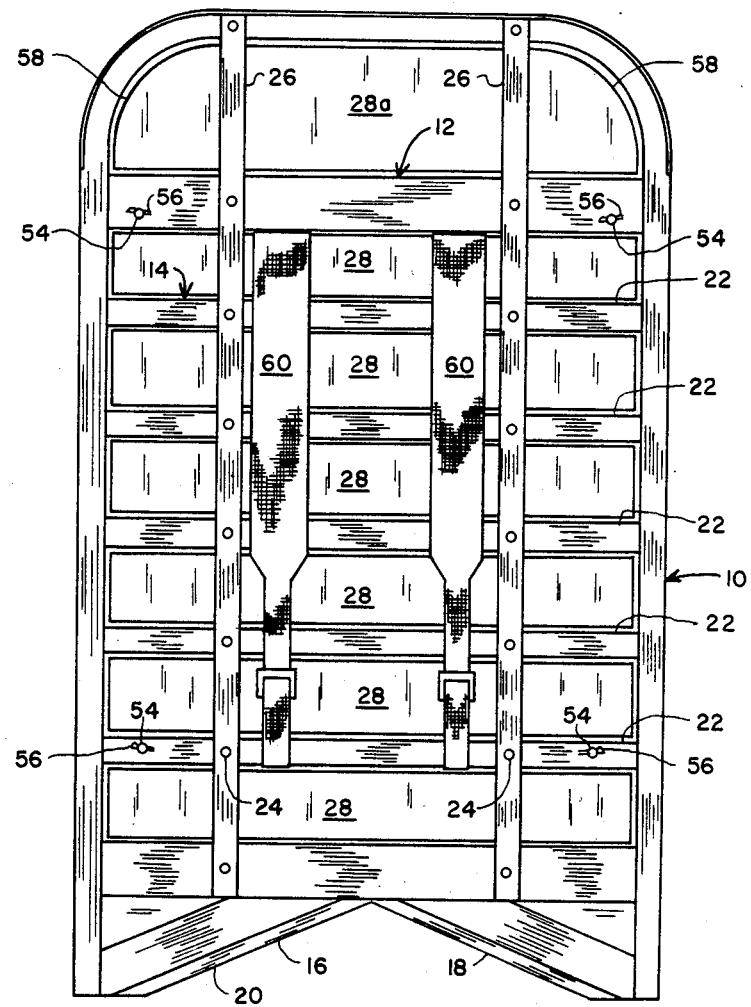
FIG. 1 is a bottom view of the base of the invention.

Referring to FIG. 1, base 10 is formed from aluminum components described herein. The outer perimeter is made of 1" square lightweight aluminum tubing, rounded at the top of the stand to form a single unit and to shed tree limbs and brush when carried on one's back.

Individual cross members 12 and 14 are placed at strategic locations and are welded in place to form base framework unit 10. Base 10 is made of $1\frac{1}{2}" \times 1"$ lightweight aluminum tubing, and cross member 14 is made of $1" \times 1"$ square lightweight tubing. Base 10 is located at the front and rear of the stand for strength and to form a V-framework 16 to be placed against a tree when in a horizontal position. A $1" \times 1" \times \frac{1}{4}"$ aluminum angle 18 is welded to the V-formed section at the rear with sharpened blade 20 to be placed against a tree for better gripping ability and non-slip quality. There are five $1" \times \frac{1}{8}"$ aluminum slats 22 strategically positioned to run from the front to the rear forming the balance of the framework. These slats are fastened in position by either welding or by $8" \times \frac{1}{4}"$ screws 24. Two additional slats 26 of this description are placed in the same manner on the reverse side (on the bottom when in a horizontal position) to form a truss for strength of the entire base and also to form a flat surface on which to place either carrying straps or a pack frame as well as to hold the sound-deadening camouflage pads 28 (to be described later).

On each side of base 10 are found $1" \times 1\frac{1}{2}"$ aluminum angles 30 and 31 (FIGS. 2 and 3) welded on top of the outer perimeter of tubing extending from the rearestmost point to the beginning of the bend on each side of the front of the base. The 1" side of the angle is positioned horizontally and adjacent to the tubing. Short pieces 32 and 33 of the same angle are mounted on each side of the base to form the front support for the tubular member that extends to the upper cutter (to be described later).

When in a horizontal position, the top of base 10 is covered with "turf" carpet 34 to form a solid floor for safety and to deaden sound. This turf was chosen to withstand the weather; and should the stand be left out of doors for any length of time, frost or mud would not cause it to be slick. The turf is secured to the rear and front by aluminum strips 36 as previously described and fastened by five screws 38.

An adjustable nylon strap 40 with a buckle 42 is fastened by a 1" square aluminum plate 44 and screws 46 and is positioned toward the rear center for balance and control of the stand with the feet when climbing and engaging a tree. A D-ring 48 and strap 50 are positioned for center support of strap 40 when feet are positioned facing the rearward end toward the tree. A bungie cord 52 is placed behind the heels to keep one's feet in strap 40 while climbing. The reason for an adjustable strap 40 is to allow for different sizes of shoes or for heavier shoes which are worn later in the season and for different climates. Four pins 54, two located in the rear and two near the front of the stand, are for fastening a backpack to the face side of the stand when folded and positioned to be carried on the back. Pins 54 have clips 56 which are also used for support in the tree stand shown in FIG. 2 and the seat of the stand shown in FIG. 3.

Camouflage pads 28 are thin foam pads covered with camouflage duck material for camouflaging and deadening sound and are inserted in voids of the metal base. These pads are removable for washing and for hunting in heavy rain. Pads 28 are uniform in size except for section 28a which fits in the front end with rounded corners 58. The cores of all tubular members of the base may be injected with liquid foam (not shown) to further deaden the sound of the metal.

Carrying straps 60 are for backpacking. This invention can be carried with straps 60 or by using an optional waist belt (not shown) such as the type used on pack frames, or an entire pack frame can be fastened to the bottom of the base if backpacking for long distances, or when a heavy pack is added to the face side. Carrying straps 60 are adjustable for carrying the stand high on the back for comfort in clear areas or thickets, or the stand can be lowered so the top of the base will be even with the shoulders when in the woods and brush.

Figure 2:
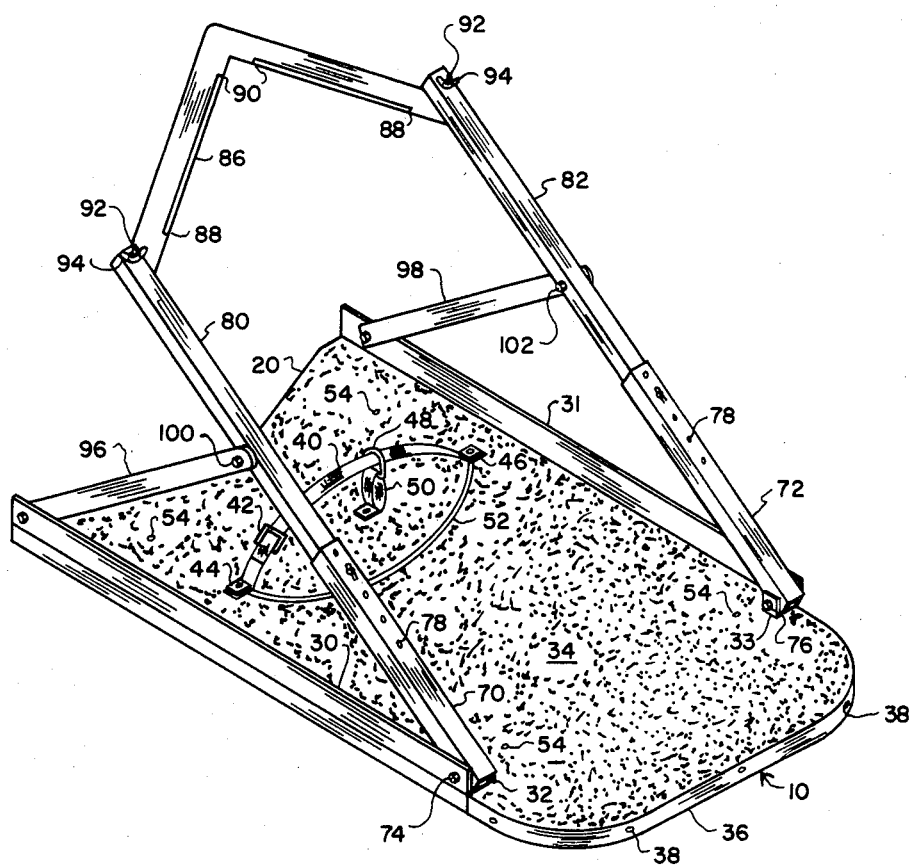
FIG. 2 is a perspective view of the invention.

Referring to FIG. 2, the complete base previously described appears as numeral 10. The design is rectangular with a V-shaped angled blade 20 and in a horizontal position which is intended to be engaged to the exterior of a tree (not shown).

The lower ends of tubular members 70 and 72 are made of $1" \times 1"$ square thick-walled aluminum and pivot on $5/16" \times 1\frac{1}{2}"$ bolts 74 (only one being shown) which also run through the front end of frame angles 30 and 31 and are secured with lock nuts 76 (only one being shown).

These tubes extend angularly upward as shown to the rear of approximately one-half the length of the base and have a series of 5/16" holes 78 in their upper end. Additional tubes 80 and 82, which are made of approximately $\frac{3}{4}" \times \frac{3}{4}"$ thick-walled aluminum and have 5/16" holes (not shown) for adjustment in their lower ends, slide telescopically inside tubes 70 and 72 and are secured by pins 54 already described. Tubes 80 and 82 extend upwardly to the rear at the same angle as tubes 70 and 72 past lower V-shaped blade 20 of base 10. The distance tubes 80 and 82 extend beyond base 10 depends on adjustments made in holes 78. The purpose of these tubes is to support the front end of the base when engaged in a tree while one is hunting.

At the upper ends of tubes 80 and 82 is a V-shaped blade 84 made of $\frac{1}{4}" \times 2"$ aluminum flat stock. The inner edge 86 is sharpened between points 88 and 90 where the blade makes contact with the opposite side of a tree. Upper V-shaped blade 84 has two $5/16" \times 2"$ bolts 92 threaded into it. Bolts 92 are for attaching the blade to the upper ends of tubes 80 and 82. The blade is secured to these tubes by two wing nuts 94. Wing nuts 94 are used so that blade 84 can be easily removed and attached around a tree.

The upper portion of tubes 70 and 72 are connected to base 10 by means of braces 32 and 33 made of 1" aluminum angle or 1" aluminum flat stock fastened to the tubes by 1"×¼" flat head bolts 74 and lock nuts 76. Braces 96 and 98 are positioned so that tubes 80 and 82 are in line with tubes 70 and 72 through the entire travel process, from fully extended to folded compactly for transit.

Holes 78 are positioned in tubes 70 and 72 so that the stand can only be used when angles of blade 86 are correctly aligned for safe use. Blade 86 can be inserted to the same orientation as V-shaped blade 20 on base 10 when folded for transit. This makes the entire unit the same length as base 10.

Figure 3:
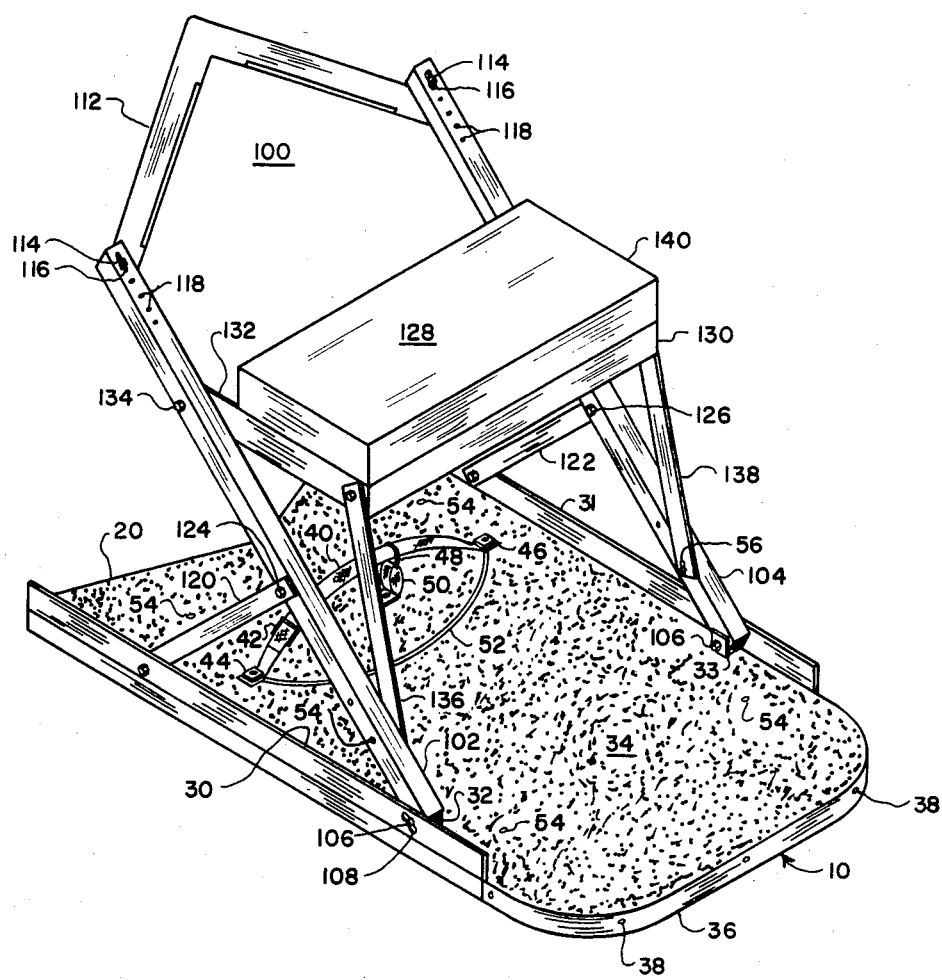
FIG. 3 is a perspective view of an alternate embodiment of the invention.

No seat is shown on this design; however, one can be put on the stand, such as the stand shown in FIG. 3. It is not recommended that a seat be used by one not completely familiar with the design. The reason for this is that, should the seat be engaged in a sitting position without the stand being on a tree, it could damage the sliding telescopic alignment. No such problem exists with the stand shown in FIG. 2.

Referring now to FIG. 3, an alternate embodiment of a hunting stand is shown having a different super structure 100 affixed to an identical base 10 as shown in FIGS. 1 and 2. All reference characters and operation for base 10 in FIG. 3 will remain the same as the reference characters and operation for base 10 in FIGS. 1 and 2.

The lowest-most part of tubular members 102 and 104, which are made of 1"×1" or ¾"×¾" thick-walled aluminum, extends angularly upward and rearward past blade 20 of base 10, are secured by bolts 106 (only one being shown) through angles 30 and 31, and are locked by wing nuts 108 (only one being shown) which are removable if one wishes to fold the stand for transport. The angle of members 102 and 104 is somewhat steeper in nature than the stand shown in FIG. 2, and its pivot point 110 is moved rearwardly approximately 4" to 6". At the upward end of tubes 102 and 104 is a V-shaped blade 112 which in turn is mounted at the upper ends of tubes 102 and 104 by bolts 114 and wing nuts 116. A plurality of holes 118 in tubes 102 and 104 provides a method for mounting blade 112 at various positions along tubes 102 and 104. The upper portions of tubes 102 and 104 are connected to base 10 by means of braces 120 and 122, with the upper portions of braces 120 and 122 connecting at approximately the center of tubes 102 and 104 by bolts 124 and lock nuts 126. The lower end of braces 120 and 122 are connected to base 10 approximately 8" forward as braces 96 and 98 shown in FIG. 2.

A seat 128 is positioned slightly rearwardly off-center, with the back portion some 3" forward of the innermost part of blade 20 of base 10. Seat 128 runs completely across the width of the stand as shown. The bottom of seat 128 runs perpendicular with base 10 of the stand. The position shown in FIG. 3 is the position of the seat after ascent of the tree. Base 130 of the seat is made of aluminum angle positioned to form a box with two extensionis 132 (only one being shown) at the rear to connect to tubular members 102 and 104 by 1½"×¼" flat head bolts and wing nuts (not shown) for a more rigid stance on the tree after ascension is completed. The front of seat frame 130 is connected to braces 136 and 138, which are of 1"×⅛" aluminum flat stock running forward and downward opposite tubular members 102 and 104 by pins 54 (only one being shown) previously described. A pad 140 is constructed of a foam rubber block covered with Naugahyde TM and/or camouflage duck, which is removable by means of Velcro TM fasteners on the bottom of pad 140 and the top of seat frame 130 so the remainder of the stand can be left out in the weather if desired.

Seat frame 130 is detachable at the rear portion of a wing nut (not shown). Seat frame 130 folds completely forward and lies completely flat on base 10. This is the position in which the seat is placed during ascent of the tree. Seat 128 may be laid down on base 10 at the rear of the stand and leaned against a tree for back support should a hunter wish to change positions and sit on base 10 of the stand. Once the stand is on the ground, seat 128 may be positioned rearwardly and secured by bolt 134 and a wing nut. This permits one to lean the bottom of the stand against a tree and allows a hunter to sit in the stand while the stand is in an inverted position, making a chair and a quite comfortable seat. The seat may be left in the position shown in FIG. 3 when bolts 110 and wing nuts 108 are removed, and the entire upper portion may be folded completely forward for transport.

I claim:

1. A tree platform comprising:
   a generally rectangular frame comprising:
   a generally V-shaped rear side edge frame member adapted to horizontally engage a tree,
   a pair of first and second, opposite, side frame members extending from said rear edge frame member,
   a front side frame member extending from said opposite side frame members,
   a plurality of spaced tubular frame members extending from one side frame member to an opposite side frame member and generally parallel with and between said rear side edge frame member and said first side frame member,
   a plurality of parallel strip members extending across, perpendicular to, said tubular frames member on an upper side of said spaced tubular frame members and attached to said tubular frame members,
   a layer of fabric attached over an upper side of said strips and forming a supporting surface for a user;
   a plurality of removable pads positioned between said spaced tubular frame members, whereby sound deadening and appearance camouflage may be effected;
   foot strap means secured to the top of said frame through said fabric for overlying and securing the feet of a person standing on the fabric;
   first and second side arm members pivotally attached to opposite frontal regions of said side frame members and extendable rearward at an angle with respect to the plane of said platform frame;
   a V-shaped tree engaging member extending between end regions of said first and second side arm members; and
   a first support arm pivotally attached to and extending from a generally rear region of said first side frame member upward and forward to, and pivotally attached to, said first side arm member and a second support arm pivotally attached to and extending from a generally rear region of second said side frame member upward and forward to, and pivotally attached to, said second side arm member.

2. A platform as set forth in claim 1 further comprising at least one second strip member extending parallel with said plurality of strip members on the underside of and attached to said tubular frame members.

3. A platform as set forth in claim 1 wherein the side arm members are each formed of front and rear mutually telescoping members, each said support arm pivotally connects to a rear telescoping member, and the length of a support arm and front telescoping member together have a length approximately equal to the distance between connections of a said side arm member to a said side frame member and a said side frame member.

4. A platform as set forth in claim 1 further comprising a seat, in turn comprising:
   a second, generally rectangular, frame having its long dimension generally corresponding to the width of said first named rectangular frame;
   a seat cushion positionable on said second frame;
   a first set of pivotal connectors, and first and second opposite side regions of said second frame being pivotally connected by said first set of pivotal connectors to a generally rear portion of said first and second side arm members, respectively;
   first and second seat supporting arms and a second set of pivotal connectors, one end of each said seat supporting arm being pivotally connected by said second set of pivotal connectors on opposite side corner regions of said second frame, and the opposite end of each said seat supporting arm being connectable to a forward region on said side arm members; and
   at least one set of said pivotal connectors are disconnectable.

5. A platform as set forth in claim 1 wherein said first and second side arm members each includes adjustable extensible portions.

* * * * *